United States Patent
Narendra (10) Patent No.: US 12,529,751 B2
(45) Date of Patent: Jan. 20, 2026

(54) COMPUTING DEVICE AND METHOD FOR WIRELESS TRANSMITTER SURVEYING

(71) Applicant: ZEBRA TECHNOLOGIES CORPORATION, Lincolnshire, IL (US)

(72) Inventor: Patrenahalli M. Narendra, Hoffman Estates, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 550 days.

(21) Appl. No.: 17/950,749

(22) Filed: Sep. 22, 2022

(65) Prior Publication Data
US 2024/0103121 A1 Mar. 28, 2024

(51) Int. Cl.
*G01S 5/02* (2010.01)

(52) U.S. Cl.
CPC .................. *G01S 5/0242* (2013.01)

(58) Field of Classification Search
CPC ....... H04W 4/029; H04W 4/023; H04W 4/33; H04W 4/026; H04W 4/021; G01S 17/86; G01S 17/87; G01S 17/88–89; G01S 17/06–36; G01S 5/145; G01S 5/0269; G01S 5/013; G01S 5/016; G01S 5/0242
See application file for complete search history.

(56) References Cited

U.S. PATENT DOCUMENTS

| | | | |
|---|---|---|---|
| 8,754,863 B2 | 6/2014 | Narendra et al. | |
| 8,963,883 B2 | 2/2015 | Narendra et al. | |
| 11,015,938 B2 | 5/2021 | Narendra et al. | |
| 11,543,249 B2 | 1/2023 | Narendra et al. | |
| 11,562,260 B2 | 1/2023 | Narendra et al. | |
| 11,567,163 B2 | 1/2023 | Narendra | |
| 2016/0132930 A1* | 5/2016 | Handly | G06Q 30/0267 705/14.58 |
| 2020/0196093 A1* | 6/2020 | Wendt | G01S 1/024 |
| 2021/0104061 A1 | 4/2021 | Narendra et al. | |
| 2022/0261578 A1 | 8/2022 | Narendra et al. | |
| 2022/0405958 A1 | 12/2022 | Narendra et al. | |
| 2023/0097019 A1 | 3/2023 | Narendra | |
| 2023/0139490 A1 | 5/2023 | Narendra | |
| 2024/0118369 A1* | 4/2024 | Aweya | G01S 5/0242 |

FOREIGN PATENT DOCUMENTS

JP 2019203826 A * 11/2019
KR 102104931 B1 * 1/2020

* cited by examiner

*Primary Examiner* — Cassi J Galt (57) ABSTRACT

A mobile computing device includes: a tracking sensor; a rangefinder; and a controller configured to: based on data from the tracking sensor, determine a current pose of the mobile computing device in a facility coordinate system, the facility containing a target wireless transmitter at an installed position; receive a transmission from the target wireless transmitter, containing an identifier of the target wireless transmitter; receive, from the rangefinder, a range value indicating a distance between the current pose and the target wireless transmitter; correlate the identifier with the range value, based on a property of the transmission; generate a location defining the installed position in the facility coordinate system, based on the current pose and the range value; and store the generated location in association with the identifier.

19 Claims, 9 Drawing Sheets

COMPUTING DEVICE AND METHOD FOR WIRELESS TRANSMITTER SURVEYING

BACKGROUND

Various infrastructure may be deployed within environments such as retail facilities, and the like. Such infrastructure may include wireless devices such as network access points or Ultra Wideband (UWB) anchors. The access points may be installed at locations deviating from specified locations (e.g., due to interfering structural elements in the facility). Incorrect locations for access points can interfere with indoor locationing technologies, and obtaining corrected locations can involve time-consuming and costly surveying operations, e.g., involving specialized equipment and trained operators.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device including: a tracking sensor; a rangefinder; and a controller configured to: based on data from the tracking sensor, determine a current pose of the mobile computing device in a facility coordinate system, the facility containing a target wireless transmitter at an installed position; receive a transmission from the target wireless transmitter, containing an identifier of the target wireless transmitter; receive, from the rangefinder, a range value indicating a distance between the current pose and the target wireless transmitter; correlate the identifier with the range value, based on a property of the transmission; generate a location defining the installed position in the facility coordinate system, based on the current pose and the range value; and store the generated location in association with the identifier.

Additional examples disclosed herein are directed to a method including: based on data from a tracking sensor, determining a current pose of a mobile computing device in a facility coordinate system, the facility containing a target wireless transmitter at an installed position; receiving a transmission from the target wireless transmitter, containing an identifier of the target wireless transmitter; receiving, from a rangefinder of the mobile computing device, a range value indicating a distance between the current pose and the target wireless transmitter; correlating the identifier with the range value, based on a property of the transmission; generating a location defining the installed position in the facility coordinate system, based on the current pose and the range value; and storing the generated location in association with the identifier.

Figure 1:
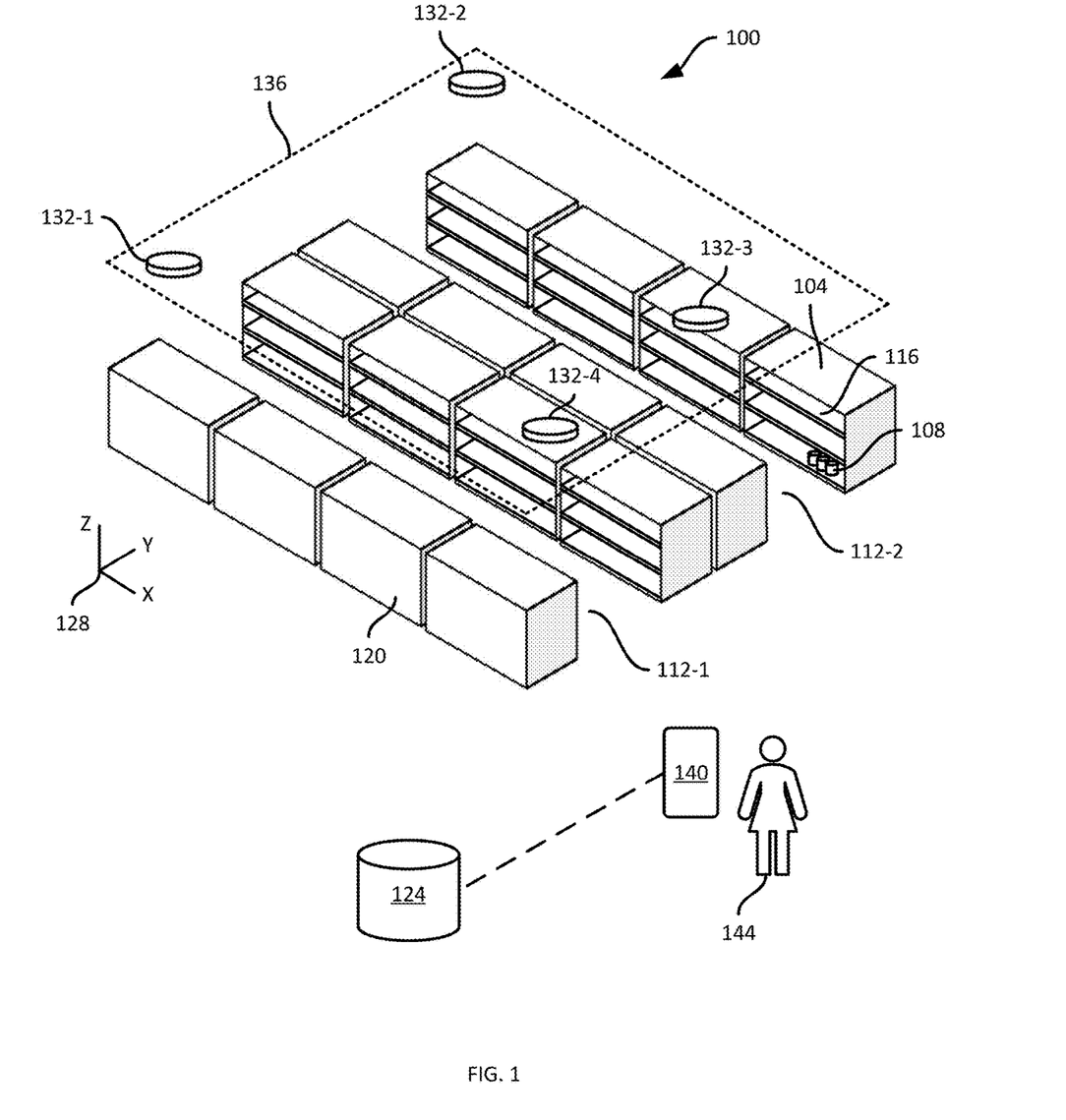
FIG. 1 is a diagram of a facility containing wireless transmitters.

FIG. 1 illustrates a facility 100, or a portion thereof, such as a warehouse, a manufacturing facility, a retail facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is also used for other components herein). In other examples, the facility can include fewer aisles 112 than shown, or more aisles 112 than shown in FIG. 1. The aisle 112, in the illustrated example, are each formed by sets of eight support structures 104 (four on each side). The facility 100 can also have a wide variety of other aisle layouts. Each aisle 112 is a space open at the ends, bounded on either side by one or more support structures 104. The aisle 112 can be travelled by humans, autonomous apparatuses, and the like.

The support structures 104 can include shelf modules, pegboards, bins, and the like, to support the items 108 thereon. As shown in FIG. 1, support structures 104 in the form of shelf modules include support surfaces 116 (supporting the items 108) accessible from the corresponding aisles 112. In the illustrated example, each support structure 104 has a back wall 120 rendering the support surfaces 116 inaccessible from the opposite side of the module. In other examples, however, the support structures 104 can be open from both sides (e.g., the back wall 120 can be omitted).

The facility 100 can have a wide variety of layouts other than that shown in FIG. 1, and at least some layouts need not include support structures 104. For example, a manufacturing facility can include various manufacturing equipment (assembly lines, and the like), instead of or in addition to the support structures 104. The positions of the support structures 104, and/or of other fixed infrastructure in the facility 100 (e.g., including walls, doorways, and the like) can be stored in a map of the facility 100. The map can be maintained in a repository 124, e.g., stored at a server or other suitable computing device. The positions in the map can include, for example, locations expressed as sets of coordinates in a facility coordinate system 128. For example, the location stored in connection with a given support structure 104 can include four sets of coordinates (e.g., each set including a coordinate on each of the X, Y, and Z axes of the system 128) corresponding to the lower corners of the support structure 104, and a height of the support structure 104. In other examples, the location stored in connection with a given support structure 104 can include eight sets of X, Y, and Z coordinates corresponding to the lower and upper corners of the support structure 104.

The map stored in the repository 124 can also include locations of other infrastructure in the facility 100. For example, the facility 100 can include a plurality of wireless transmitters 132, of which four example transmitters 132-1, 132-2, 132-3, and 132-4 are illustrated in FIG. 1. The facility 100 can include fewer transmitters 132, or a greater number of transmitters 132, in other examples. The transmitters 132 are mounted on a ceiling 136 of the facility 100 in the illustrated example, but can also be mounted in a wide variety of other locations, in other examples.

The transmitters 132 can be access points (APs) implementing one or more wireless local area networks (WLANs), such as Wi-Fi networks or the like. In other examples, the transmitters 132 can be beacons, such as Bluetooth™ Low Energy (BLE) beacons or the like. The transmitters 132 can also be combinations of the above in some examples. Each transmitter 132 has an identifier distinguishing that transmitter 132 from the other transmitters 132. For example, the identifiers can be media access control (MAC) addresses, or the like.

The transmitters 132, in addition to implementing networks or other functions, can be employed by computing devices within the facility 100 for locationing. For example, such a computing device (e.g., a mobile computer, an autonomous vehicle operating within the facility 100, or the like) can determine distances between the computing device and two or more of the transmitters 132. The distances can be determined based on signal strength measurements such as received signal strength indicators (RSSI), and/or on return trip times (RTT) for data exchanges between the computing device and the transmitters 132.

Using the determined distances and locations of the transmitters 132 retrieved from the repository 124, the computing device can triangulate its location relative to the coordinate system 128. Such a locationing process, however, is dependent in part on the accuracy of the transmitter locations stored in the repository 124. Although locations for the transmitters 132 may be specified at the time of installation of the transmitters 132, the actual installed positions of the transmitters 132 may deviate from the specified locations, e.g., due to installer error, interfering infrastructure such as ductwork, or the like. Obtaining updated locations for the repository 124 that reflect the true installed positions of the transmitters 132 may involve time-consuming measurements, e.g., involving costly surveying equipment and trained operating staff, or the like. An example of such surveying equipment includes a rangefinder mounted on an angular resolver, which is in turn fixed to a stable surface (e.g., the floor of the facility 100). In addition to the complexity of calibrating and operating such a device, surveying the installed position of each transmitter 132 in the facility 100 may involve relocating, and therefore recalibrating, the device numerous times.

As discussed below, a mobile computing device 140 is deployed in the facility 100 and implements functionality to survey the installed positions of the transmitters 132 that mitigates the time-consuming nature and/or operator training requirements of other surveying mechanisms. The device 140 can be operated by a worker 144 traveling within the facility 100 (e.g., on foot), and can track its current pose (e.g., location and orientation) in the coordinate system 128, as well as collect range measurements from the device 140 to transmitters 132. Using the tracked pose and the range measurements, as well as properties of transmissions received at the device 140 from the transmitters 132, the device 140 can generate, for each transmitter 132, a location defining the true installed position of the transmitter 132, and update the map in the repository 124 with the generated location.

Figure 2:
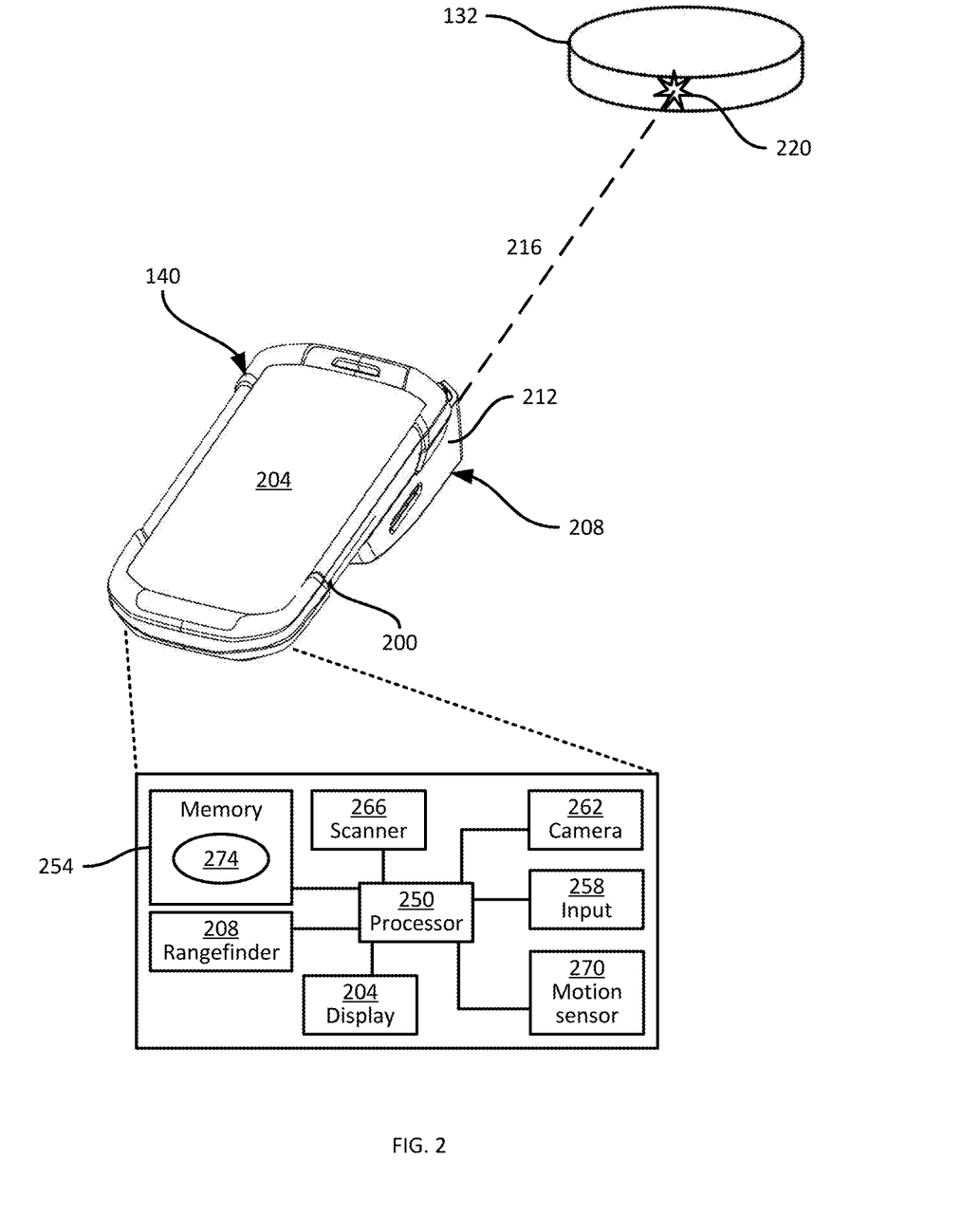
FIG. 2 is a diagram of a mobile computing device with a rangefinder.

Turning to FIG. 2, the device 140 is shown in greater detail, and certain internal components of the device 140 are also illustrated. The device 140 includes a device housing 200 that supports various other components of the device 140, including a display 204. The device 140 also includes a rangefinder 208. The rangefinder 208 can be integrated with the housing 200 in some examples. In other examples, the rangefinder 208 includes a separate accessory housing 212 that is removably coupled to the housing 200 of the device 140. The rangefinder 208 can implement any of a variety of suitable range-finding technologies. In the present example, the rangefinder 208 is a laser rangefinder, and thus emits a beam 216 of laser light and determines, based on reflections of the beam 216 from an external point 220 on an object such as a transmitter 132, a range value from the rangefinder 208 to the external point 220. Other examples of range-finding technologies that can be employed by the rangefinder 208 include ultrasound, stereo image sensors, and the like.

The device 140 is configured to use its tracked pose in the coordinate system 128, in combination with range values obtained via the rangefinder 208, to determine three-dimensional locations (also in the coordinate system 128) of the wireless transmitters 132. The device 140 can also be configured to use transmissions received at the device 140 from the transmitters 132 to correlate three-dimensional locations determined from tracked poses and range values with wireless transmitters 132.

As shown in FIG. 2, the device 140 includes a processor 250 (also referred to as a controller 250), such as a central processing unit (CPU), graphics processing unit (GPU), or combination thereof. The processor 250 is connected with a non-transitory computer readable storage medium, such as a memory 254. The memory 254 includes a combination of volatile and non-volatile memory elements (e.g., any one, or any suitable combination of, random access memory (RAM), read only memory (ROM), electrically erasable programmable read only memory (EEPROM), flash memory, and the like). The processor 250 and the memory 254 can be implemented as one or more integrated circuits.

The device 140 also includes at least one input device 258 connected with the processor 250. The input device 258 is configured to receive input (e.g., from an operator of the device 140) and provide data representative of the received input to the processor 250. The input device 258 includes any one of, or any suitable combination of, a touch screen integrated with the display 204, a keypad, a trigger button, a microphone, and the like. In addition, the device 140 includes a camera 262 including a suitable image sensor or combination of image sensors. The camera 262 is configured to capture a sequence of images (e.g. a video stream) for provision to the processor 250 and subsequent processing, e.g., to track the pose of the device 140. The camera 262 can include any one of, or any suitable combination of, a color camera, an infrared camera, a depth camera such as a time-of-flight sensor, stereo camera, or the like.

The device 140 can also include a scanning assembly 266 (also referred to as a scanner 266), such as a barcode scanner. The scanner 266 can be an image-based scanner, and thus include further image sensors in addition to those mentioned above in connection with the camera 262. In other examples, the scanner 266 is a laser-based scanner.

In addition to the display 204, the device 140 can also include one or more other output devices, such as a speaker, a notification LED, and the like (not shown). Further, the device 140 includes a motion sensor 270, such as an inertial measurement unit (IMU) including one or more accelerometers, one or more gyroscopes, and/or one or more magnetometers. The motion sensor 270 is configured to generate data indicating detected movement of the device 140 and provide the data to the processor 250, for processing along with the images from the camera 262 to track the current pose of the device 140. Therefore, the camera 262 and the motion sensor 270 may also be referred to as a tracking sensor. As will be apparent to those skilled in the art, other combinations of image sensors and/or motion sensors can be employed to implement a tracking sensor.

The memory 254 stores computer readable instructions for execution by the processor 250. In particular, the memory 254 stores a surveying application 274 (also referred to as the application 274) which, when executed by the processor 250, configures the processor 250 to perform various functions discussed below in greater detail and related to the tracking of the pose of the device 140 and the generation of three-dimensional positions for external points based on the tracked pose and range measurements. The application 274 can also be implemented as a suite of distinct applications in other examples.

Those skilled in the art will appreciate that the functionality implemented by the processor 250 via the execution of the application 274 may also be implemented by one or more specially designed hardware and firmware components, such as field programmable gate arrays (FPGAs), application-specific integrated circuits (ASICs) and the like in other embodiments. In further embodiments, some or all of the functionality of the processor 250 can be implemented by a microcontroller of the rangefinder 208.

Figure 3:
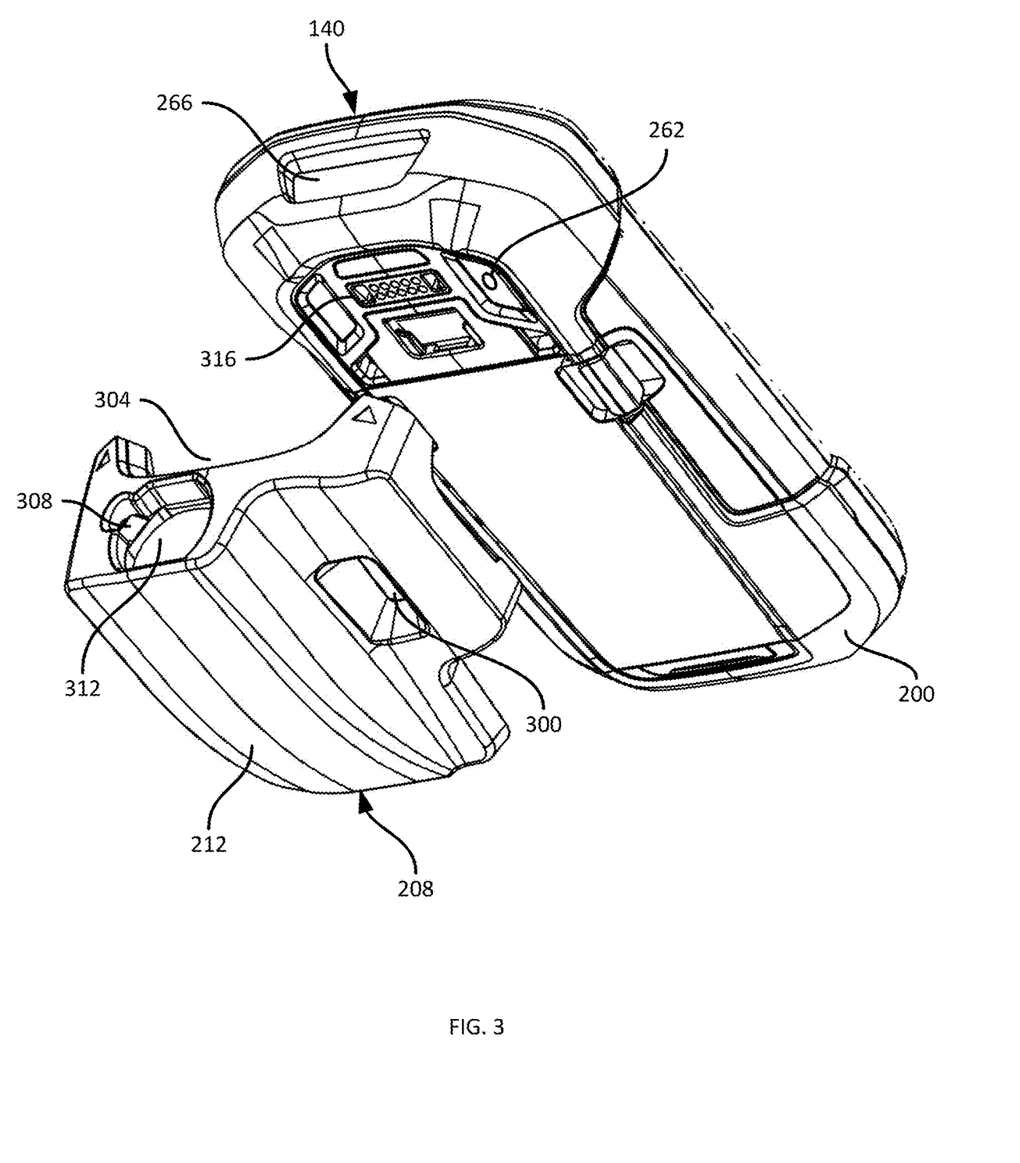
FIG. 3 is an exploded view of the mobile computing device and rangefinder of FIG. 2.

Turning to FIG. 3, an exploded view of the device 140 is shown from the bottom, illustrating certain additional features of the device 140. In particular, the position of the camera 262 in the present example is illustrated, on a rear (i.e. facing away from the display 204) surface of the device housing 200. In other examples, additional cameras may be placed on other locations of the device housing 200. The accessory housing 212 is shaped and dimensioned to cooperate with a rear portion of the device housing 200, to removably couple the accessory housing 212 to the device housing 200 in a predefined position (i.e., such that the position of the rangefinder 208 relative to the device housing 200 is substantially identical whenever the rangefinder 208 is coupled to the device housing 200). The accessory housing 212 includes an opening 300 therethrough that is disposed around the camera 262 when the rangefinder 208 is coupled with the device housing 200, permitting continued use of the camera 262.

The accessory housing 212 also includes a cutout 304 to accommodate a sensor window of the scanner 266 when the rangefinder 208 is coupled with the device housing 200. As seen in FIG. 3, the rangefinder 208 includes a laser emitter 308, configured to emit the beam 216 shown in FIG. 1, and a sensor 312 to detect reflections from the beam 216. The rangefinder 208 also includes a controller, which may be distinct from the processor 250 or may be implemented by the processor 250, that determines a range measurement from the above-mentioned reflections.

The device housing 200 and the accessory housing 212 are provided with cooperating communications interfaces, permitting control signals and range measurements to travel between the rangefinder 208 and the processor 250. In the present example, the interface includes a plurality of data and/or power contacts 316 on a rear surface of the device housing 200, connected to the processor 250.

Figure 4:
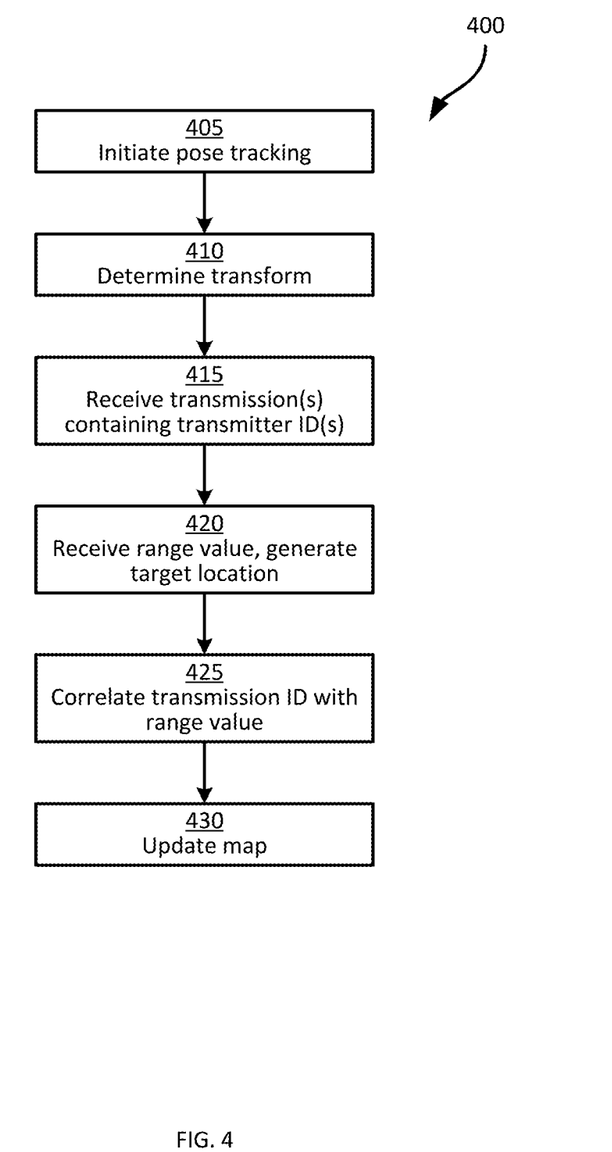
FIG. 4 is a flowchart of a method for wireless transmitter surveying.

Turning to FIG. 4, a method 400 of wireless transmitter surveying is illustrated. The method 400 is described below in conjunction with an example performance of the method 400 by the device 140.

At block 405, the device 140 is configured to initiate pose tracking. That is, the device 140 begins tracking successive poses, e.g., positions and orientations of the device 140 in the coordinate system 128, at any suitable frequency (e.g. at a frequency of about 30 or 60 Hz, although a wide variety of other pose estimation frequencies can also be employed). The frequency with which pose estimates are generated by the device 140 may depend, for example, on the frame rate of the camera 262 and/or the sampling frequency of the motion sensor 270. Pose tracking can be initiated responsive to receiving an input command, e.g. from the operator of the device 140, via the input device 258. Each pose can include, for example, a location defined by X, Y, and Z coordinates in the coordinate system 128, as well as an orientation defined by angles in each of the XY, XZ, and YZ planes of the coordinate system 128.

To track the pose of the device 140, the processor 250 controls the tracking sensor to capture data representing the surroundings of the device 140, as well as motion of the device 140. In the present example, the processor 250 controls the camera 262 to begin capturing a stream of images and providing the images to the processor 250. The processor 250 also controls the motion sensor 270 to provide motion data (e.g., defining accelerations affecting the device 140, as well as changes in orientation of the device 140). The processor 250 detects one or more image features in the images from the camera 262, and tracks the changes in position of such features between images. Examples of features include corners, edges (e.g., changes in gradient) and the like detectable via any suitable feature-detection algorithms. The movement of such features between images is indicative of movement of the device 140.

The positions of the above-mentioned image features, as well as motion data from the motion sensor 270, can be provided as inputs to a pose estimator implemented by the processor 250, such as a Kalman filter. Various mechanisms will occur to those skilled in the art to combine image and/or motion sensor data to generate pose estimations. Examples of such mechanisms include simultaneous localization and mapping (SLAM) processes, such as those implemented by the ARCore software development kit provided by Google LLC, and the ARKit software development kit provided by Apple Inc. Pose tracking at block 405, once initiated, is performed continuously throughout the remainder of the method 400.

Figure 5:
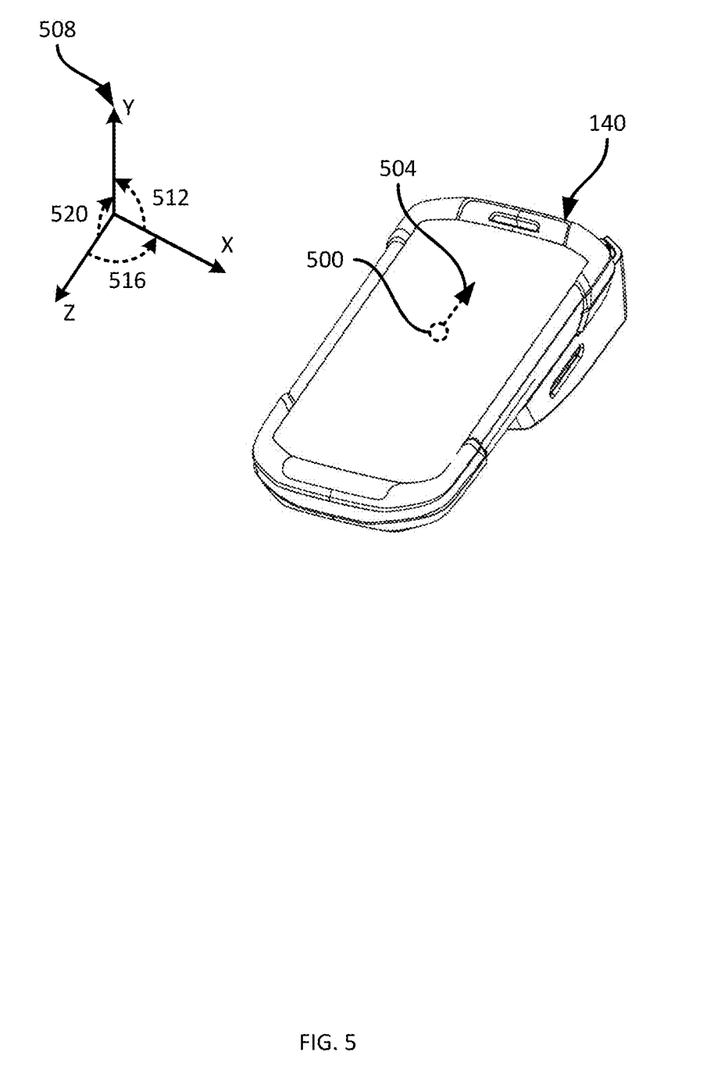
FIG. 5 is an example performance of block 405 of the method of FIG. 4.

Turning to FIG. 5, an example pose estimate is illustrated as determined at block 405, including a location 500 and an orientation 504. The location 500 represents the location of a centroid of the device 140, but in other embodiments, the location 500 can correspond to a different point of the device 140. The orientation 504 represents the direction in which the front of the device 140 (e.g., a forward surface, bearing the window of the scanner 266 shown in FIG. 3) is currently facing. The location 500 and orientation 504 are defined relative to a three-dimensional coordinate system 508. In particular, the location 500 is defined by positions along each of the X, Y, and Z axes of the coordinate system 508, and the orientation 504 is defined by angles in each of three planes (e.g., an angle 512 in the XY plane, an angle 516 the XZ plane, and an angle 520 in the ZY plane). The origin of the coordinate system 508 is defined arbitrarily by the processor 250 when the performance of block 405 begins. For example, the origin of the coordinate system 508 may be set as the current location of the centroid of the device 140. Thus, the first tracked pose upon initiation of pose tracking may have a location of [0, 0, 0], indicating that the device 140 is at the origin of the coordinate system 508. The tracked poses of the device 140 in the coordinate system 508 may therefore not align with the coordinate system 128.

Returning to FIG. 4, at block 410 the device 140 is configured to determine a transform between the local coordinate system 508 and the facility coordinate system 128. The transform includes one or more of a translation between the origins of the coordinate systems 228 and 508, and rotation(s) in the planes of the coordinate system 508 to align those planes with the planes of the coordinate system 128.

Determining the transform at block 410 can include capturing an image of an anchor structure in the facility 100 with the camera 262. Anchor structures have predetermined positions in the facility 100, and the predetermined positions are stored, e.g., in the repository 124 for access by the device 140. In some examples, the predetermined positions are encoded directly on the anchors, e.g., as barcodes. The device 140 can therefore retrieve the location of an anchor in the coordinate system 128 from the repository 124, and determine the location of the anchor in the local coordinate system 508.

Figure 6:
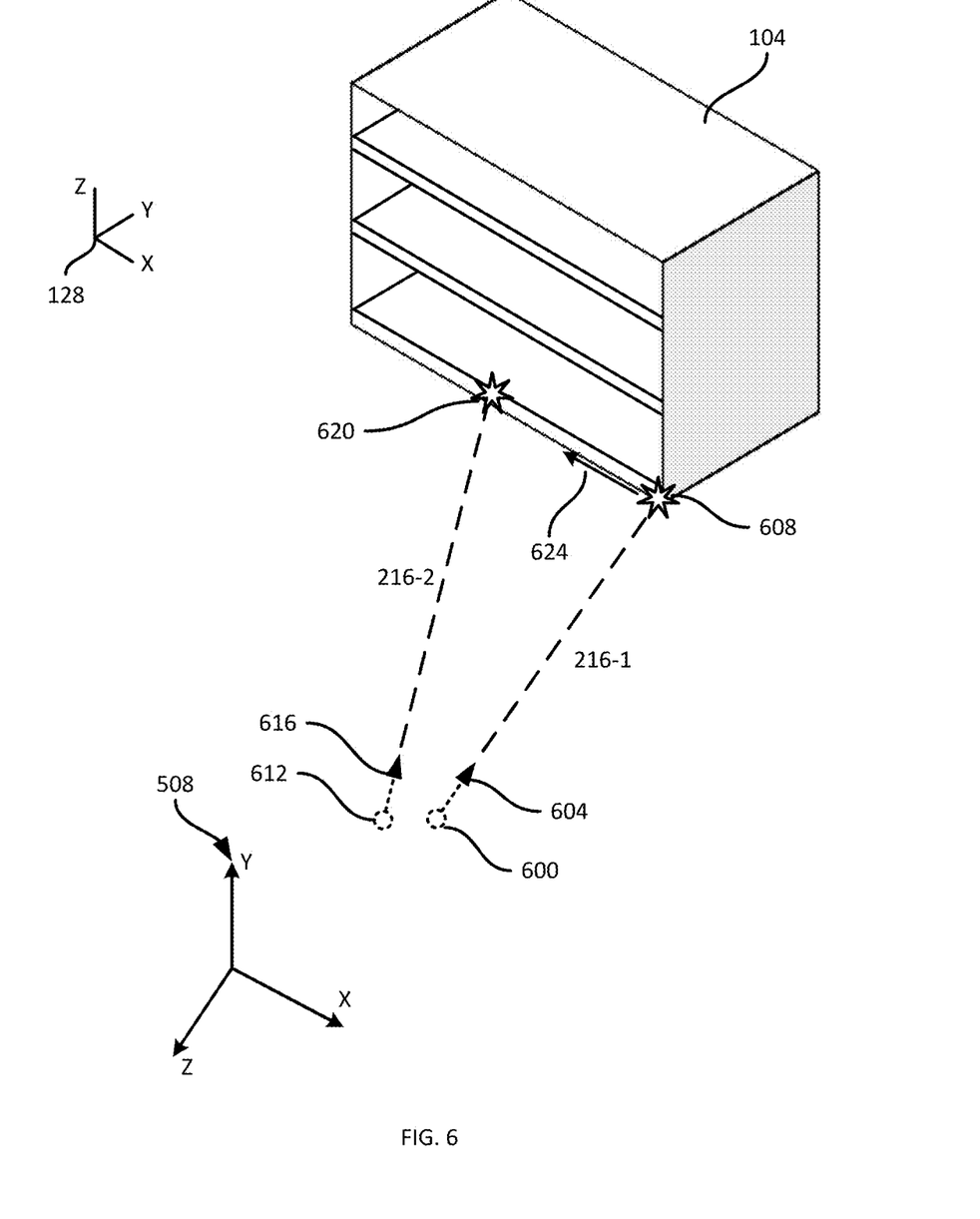
FIG. 6 is an example performance of block 410 of the method of FIG. 4.

Turning to FIG. 6, an example performance of block 410 is illustrated, using a support structure 104 in the facility 100 as an anchor for determining the transform between coordinate systems 228 and 508. For example, the device 140 can be operated, from a first pose defined by a first location 600 and a first orientation 604 in the coordinate system 508, to emit a first beam 216-1. The device 140 can be positioned (e.g., by an operator of the device 140 such as the worker 144) such that the beam 216-1 impacts a predetermined portion of a support structure 104, such as a lower corner 608 of the support structure. Using the current pose of the device 140 (the location 600 and orientation 604), and the distance along the beam 216-1 to the corner 608 generated by the rangefinder 208, the processor 250 can determine the location of the corner 608 in the coordinate system 508.

The device 140 is then operated, from a second pose defined by a location 612 and an orientation 616, to emit a second beam 216-2 to reflect from the support structure 104 at a point 620 along the lower edge of the support structure 104. Using the current pose of the device 140 (the location 612 and orientation 616), and the distance along the beam 216-2 to the point 620 generated by the rangefinder 208, the processor 250 can determine the location of the point 620 in the coordinate system 508.

The locations of the corner 608 and the point 620 can be used by the processor 250 to determine a vector 624 in the coordinate system 508, with a location at the corner 608 and an orientation directed towards the point 620. In other words, the locations of the corner 608 and the point 620 in the coordinate system 508 can be used to determine an observed pose of the corner 608 in local coordinates. The device 140 can then be configured to retrieve, e.g., from the repository 124, a previously determined reference pose of the corner 608 in the facility coordinate system 128. From the observed pose and reference pose of the corner 608, the device 140 can determine a transform between the coordinate systems 128 and 508. Each pose of the device 140 determined via the pose tracking initiated at block 405 can then be transformed into a pose in the facility coordinate system 128.

The reference pose of the corner 608 can be stored in the repository 124, e.g., as part of a map of the facility 100. To retrieve the pose of the corner 608 from the repository 124, rather than the pose of a corner of another support structure 104 defined in the map, the processor 250 can be configured to retrieve data for the support structure 104 closest to the current pose of the device 140. In other examples, the processor 250 can present an interface on the display 204, including a rendering of the facility map, and prompt an operator of the device 140 to select which support structure the beams 216 were directed towards. Support structures may be labelled on such an interface, for example, by aisle number or the like.

Returning to FIG. 4, at block 415 (while pose tracking continues) the device 140 is configured to receive transmissions from one or more of the wireless transmitters 132. The transmissions can include beacons, probe response frames, or the like. Each wireless transmitter 132 can be configured to send such transmissions periodically, and/or in response to requests from the device 140. The transmissions can therefore be specifically addressed to the device 140, or can be broadcast for reception by any computing devices within receiving range. Each transmission includes at least an identifier of the corresponding wireless transmitter 132, such as a MAC address, or the like.

Figure 7:
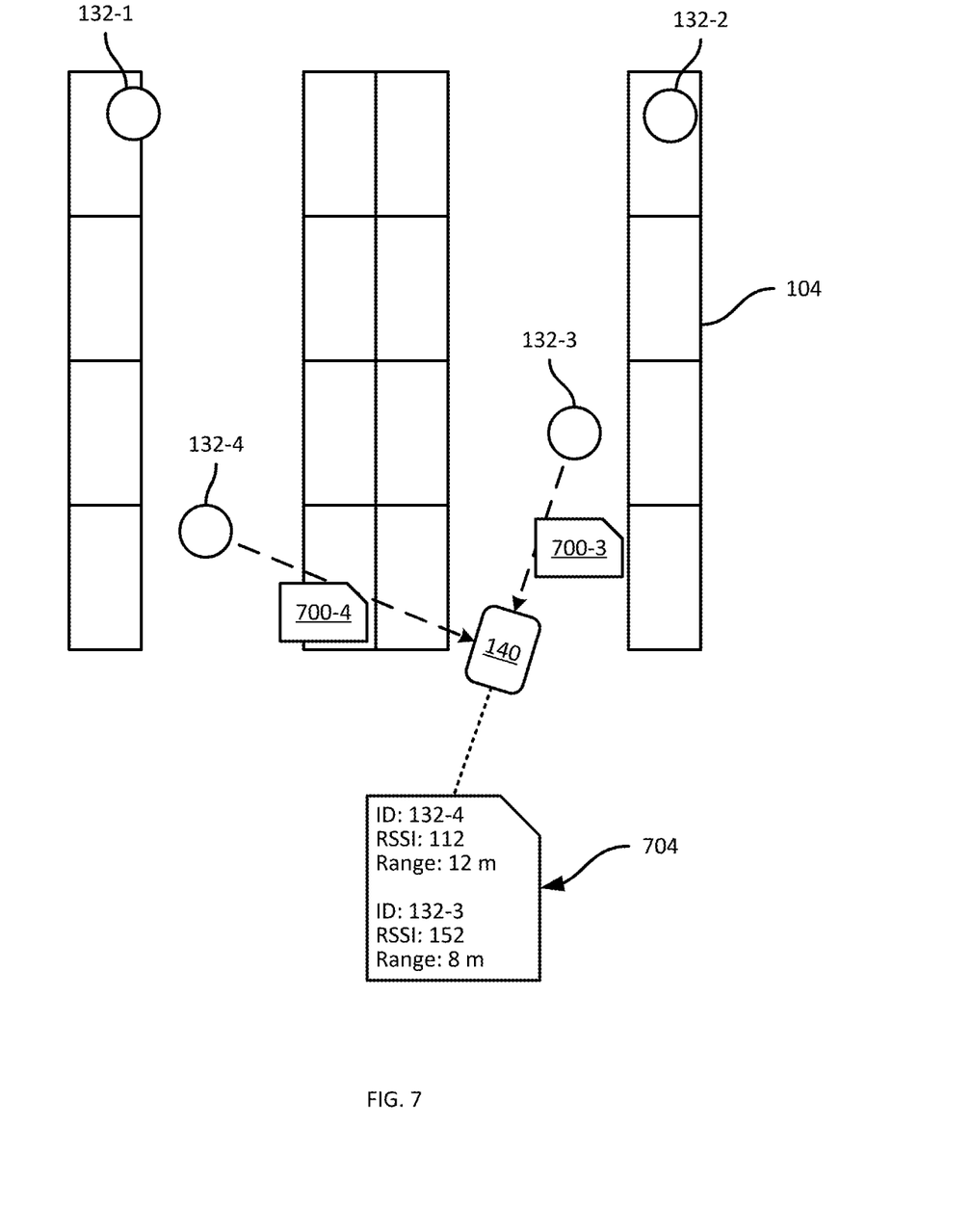
FIG. 7 is an example performance of block 415 of the method of FIG. 4.

FIG. 7 illustrates an example performance of block 415. In the illustrated example, the device 140 receives transmissions 700-3 and 700-4 from the wireless transmitters 132-3 and 132-4, respectively. The device 140 may be out of receiving range of the wireless transmitters 132-1 and 132-2 in this example, but it will be understood that in other examples, the device 140 can receive further transmissions from additional wireless transmitters 132 beyond the transmitters 132-3 and 132-4.

The device 140 can be configured to store data 704 extracted and/or derived from the transmissions 700. For example, the data 704 includes the identifiers of the transmitters 132-3 and 132-4, as well as range estimates from the device 140 to the transmitters 132-3 and 132-4. The range estimates can be derived from signal strength measurements, such as RSSI values as shown. The range estimates can also be derived from other properties of the transmissions 700 beyond RSSI values, such as round trip times (RTT). The range estimates are used by the device 140 to correlate wireless transmitter 132 identifiers with range values obtained from the rangefinder 208, as discussed below.

Referring again to FIG. 4, at block 420 the device 140 is configured to receive a range measurement. Specifically, the range measurement is received at the processor 250 from the rangefinder 208. The range measurement can be received responsive to a trigger command, e.g., from the operator of the device 140, via the input device 258. For example, the operator of the device 140 can position the device 140 to aim the beam 216 at the wireless transmitter 132-3, and activate the input device 258 to generate a range measurement.

Figure 8:
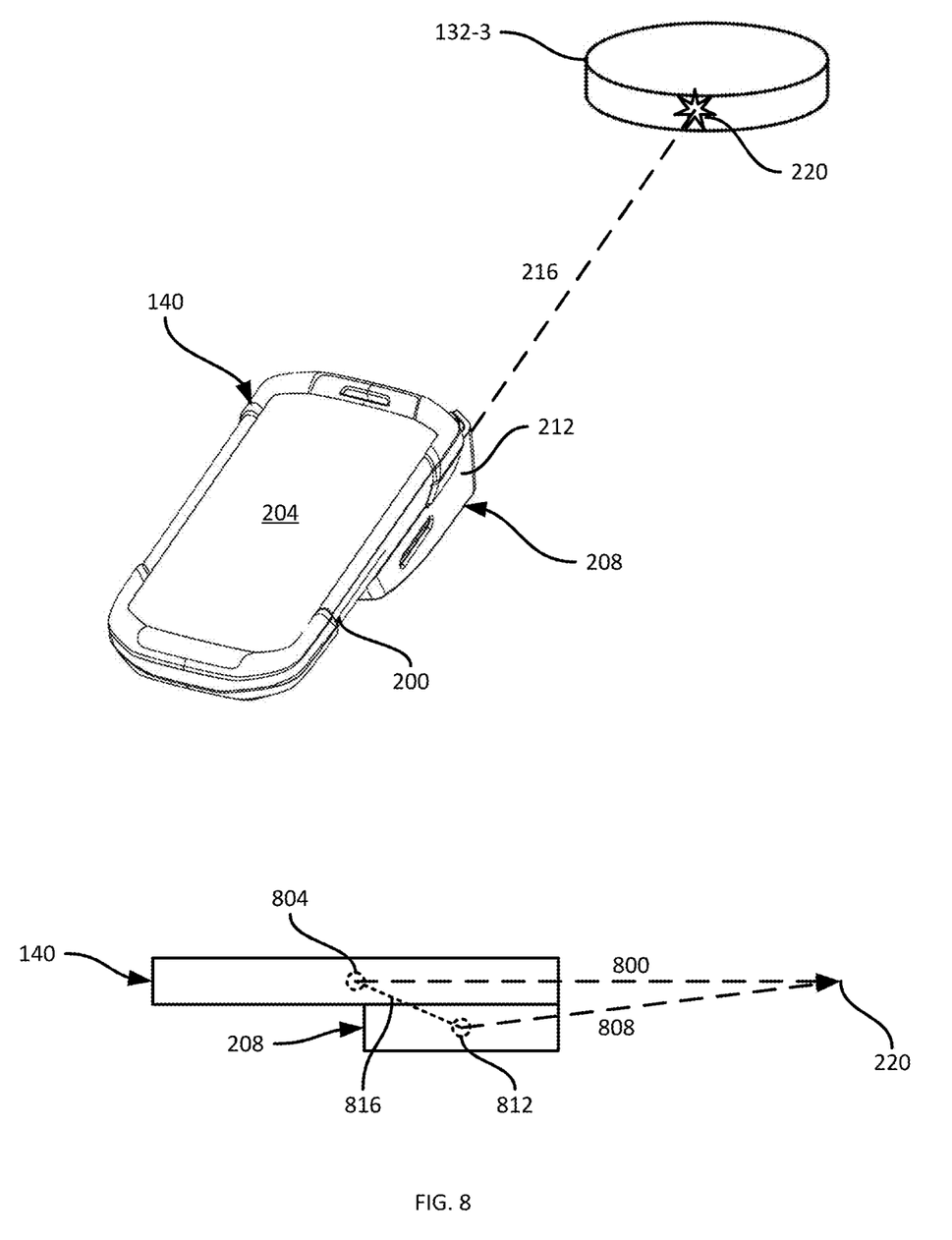
FIG. 8 is an example performance of block 420 of the method of FIG. 4.

FIG. 8 illustrates the device 140 positioned as noted above, with the beam 216 reflecting from the wireless transmitter 132-3. Via the rangefinder 208, the processor 250 obtains a range measurement 800 to the point 220 on the wireless transmitter 132-3. As illustrated in the lower portion of FIG. 8, the range value 800 represents a distance between the current location 804 of the device 140) and the point 220. The data returned to the processor 250 from the rangefinder 208 may define the range value 800 itself, or may define an intermediate measurement, such as a range 808 from the point 220 to a reference origin 812 of the rangefinder 208 itself. The reference origin 812 is shown as the centroid of the rangefinder 208, but can also be any other point of the rangefinder 208 (e.g. a selected corner of the rangefinder 208). In such examples, the processor 250 retrieves (e.g. from the memory 254) calibration data defining a geometric transformation 816 between the range finder reference origin 812 and the location 804 of the device 140, to generate the range value 800.

The processor 250 is also configured to generate a location of the point 220 (that is, of the target wireless transmitter 132) at block 420, e.g., in the coordinate system 128. Because the pose of the device 140 is tracked, the location 804 is defined in the coordinate system 128, and the orientation of the range 800 is also defined in the coordinate system 128 (matching the orientation of the device 140). The location of the point 220 in the coordinate system 128 can therefore be determined from the current pose of the device 140 (i.e., the pose coinciding in time with activation of the rangefinder 208) and the range value 800.

At block 425, the processor 250 is configured to correlate an identifier from block 415 to the range value from block 420. The correlation at block 425 can be performed by determining a difference between the range estimate derived from the RSSI value or other property of the transmission from block 415, and the range value from block 420. Although the range estimates derived from transmissions from the wireless transmitters 132 may include some degree of measurement error, similarity between a range estimate and the range value from the rangefinder 208 indicates that the range value likely corresponds to the wireless transmitter 132 with which the range estimate is associated.

Figure 9:
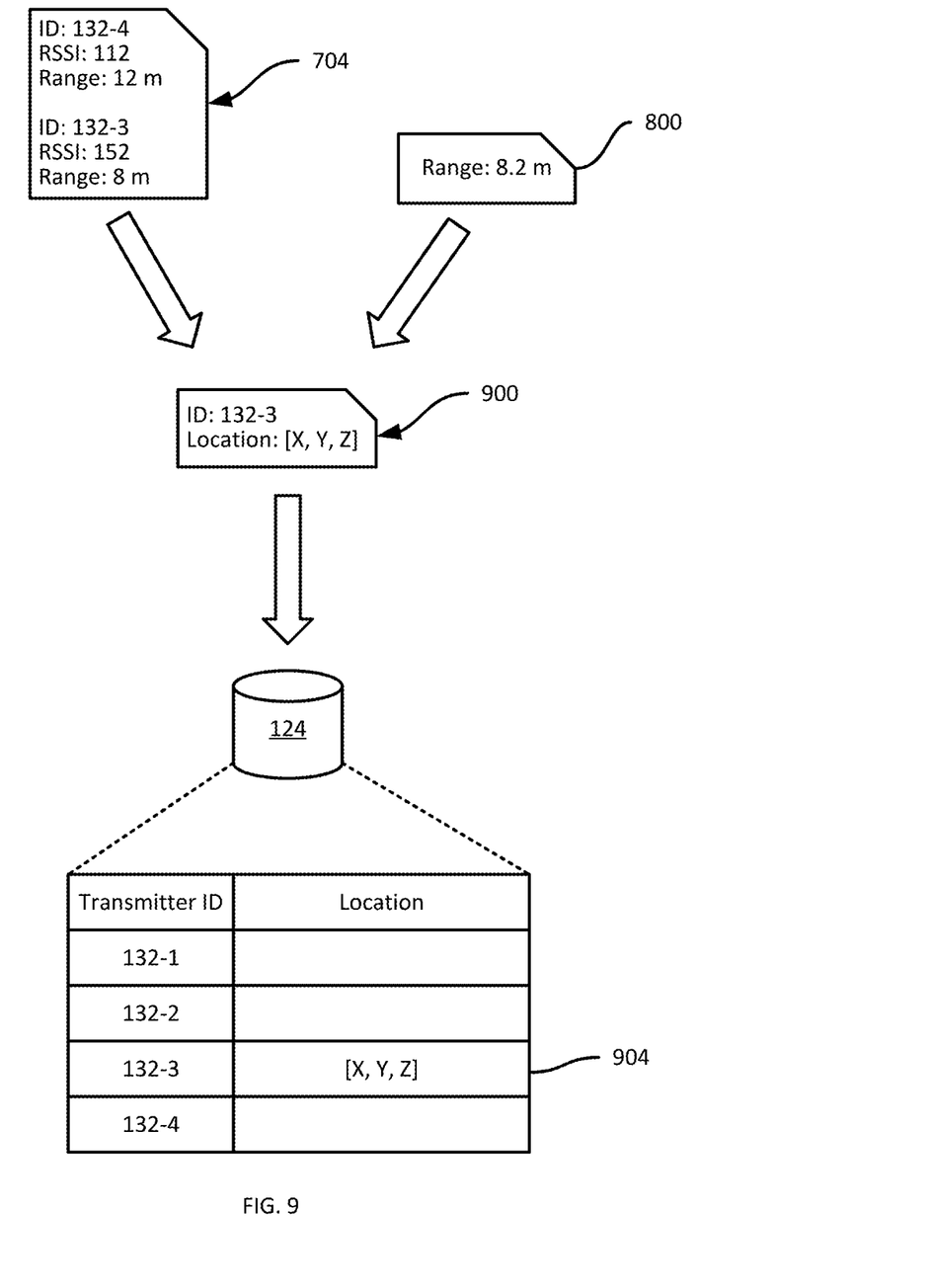
FIG. 9 is an example performance of blocks 425 and 430 of the method of FIG. 4.

Turning to FIG. 9, for example, the data 704 from the transmissions received at block 415 is shown, along with the range value 800 shown in FIG. 8. The processor 250 is configured to compare the range value 800 with each of the range estimates in the data 704. The differences between the range value 800 and the range estimates in the data 704 are 3.8 meters for the transmitter 132-4, and 0.2 meters for the transmitter 132-3. The processor 250 can be configured to compare the above differences to a predetermined threshold, e.g., 1 meter, and to select the transmitter 132 with a range estimate that yields a difference smaller than the threshold. In this example, therefore, the processor 250 selects the transmitter 132-3 for correlation with the range value 800. In some examples, instead of or in addition to a threshold, the processor 250 can determine which of the range estimates derived from transmissions is closest to the range value 800. For instance, any range estimates that differ from the range value 800 by more than the threshold can be discarded, and the processor 250 can select the closest range estimate from any remaining range estimates. In the event that no range estimate is closer to the range value 800 than the threshold, the processor 250 can control the display 204 to render a notification prompting the worker 144 to perform a further activation of the rangefinder 208.

At block 430, the processor 250 is configured to update the map, e.g., in the repository 124, with the location of the target wireless transmitter 132. Turning again to FIG. 9, for example, the device 140 can be configured to transmit update data 900 to the repository 124, including the identifier of the target wireless transmitter 132-3, and the location from block 420 (i.e., the location of the point 220 shown in FIG. 8). The repository 124 can therefore be updated to include the location in a record 904 corresponding to the wireless transmitter 132-3. The method 400 can be repeated for each remaining wireless transmitter 132 to be surveyed (e.g., the transmitters 132-1, 132-2, and 132-4, for which the repository 124 does not yet contain locations as shown in FIG. 9).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
   a tracking sensor;
   a laser rangefinder; and
   a controller configured to:
   based on data from the tracking sensor, determine a current pose of the mobile computing device in a facility coordinate system, the facility containing a target wireless transmitter at an installed position;
   receive a transmission from the target wireless transmitter, containing an identifier of the target wireless transmitter;
   receive, from the laser rangefinder, a range value indicating a distance between the current pose and the target wireless transmitter;
   correlate the identifier with the range value, based on a property of the transmission;
   generate a location defining the installed position in the facility coordinate system, based on the current pose and the range value; and
   store the generated location in association with the identifier.

2. The mobile computing device of claim 1, wherein the tracking sensor includes an inertial measurement unit (IMU) and a camera; and
   wherein the controller is configured to determine the current pose by:
   obtaining motion data from the IMU;
   detecting positions of features in successive images captured by the camera; and
   combine the motion data and the positions of the features.

3. The mobile computing device of claim 1, wherein the rangefinder is configured to measure the range value between the mobile computing device and the wireless transmitter responsive to an activation of the rangefinder;
   wherein the controller is configured to receive the range value from the rangefinder.

4. The mobile computing device of claim 1, further comprising an input device connected with the controller.

5. The mobile computing device of claim 4, wherein activation of the rangefinder is caused by a command received via the input device.

6. The mobile computing device of claim 1, further comprising:
   a device housing supporting the controller and the tracking sensor; and
   an accessory housing supporting the rangefinder, wherein the accessory housing is removably coupled to the device housing.

7. The mobile computing device of claim 1, wherein the controller is configured to correlate the identifier with the range value by:
   determining a range estimate from the property of the transmission; and
   determining that a difference between the range estimate and the range value is smaller than a threshold.

8. The mobile computing device of claim 7, wherein the property of the transmission includes at least one of (i) a signal strength measurement, or (ii) a round trip time.

9. The mobile computing device of claim 7, wherein the controller is configured to:
   receive respective transmissions from a plurality of wireless transmitters including the target wireless transmitter;
   determine range estimates corresponding to each of the transmissions; and
   select one of the transmissions closest to the range value as corresponding to the target wireless transmitter.

10. The mobile computing device of claim 1, wherein the controller is configured to store the generated location in association with the identifier by:
    updating a portion of a map of the facility corresponding to the target wireless transmitter to include the generated location.

11. The mobile computing device of claim 1, wherein the controller is configured to determine the current pose of the mobile computing device in the facility coordinate system by:
    determining a local pose of the mobile computing device in a local coordinate system;
    determining an observed location of an anchor disposed in the facility, in the local coordinate system;
    obtaining a reference location of the anchor in the facility coordinate system; and
    determining a transformation between the local coordinate system and the facility coordinate system based on the observed location and the reference location.

12. A method, comprising:
    based on data from a tracking sensor of a mobile computing device, determining a current pose of the mobile computing device in a facility coordinate system, the facility containing a target wireless transmitter at an installed position;

receiving, by the mobile computing device, a transmission from the target wireless transmitter, containing an identifier of the target wireless transmitter;

receiving, from a laser rangefinder of the mobile computing device, a range value indicating a distance between the current pose and the target wireless transmitter;

correlating the identifier with the range value, based on a property of the transmission;

generating a location defining the installed position in the facility coordinate system, based on the current pose and the range value; and storing the generated location in association with the identifier.

13. The method of claim 12, wherein the tracking sensor includes an inertial measurement unit (IMU) and a camera; and wherein determining the current pose includes:

obtaining motion data from the IMU;

detecting positions of features in successive images captured by the camera; and combining the motion data and the positions of the features.

14. The method of claim 12, wherein receiving the range value comprises:

receiving an activation of the rangefinder; and controlling the rangefinder to measure the range value between the mobile computing device and the wireless transmitter responsive to the activation.

15. The method of claim 14, wherein receiving the activation includes receiving a command via an input device of the mobile computing device.

16. The method of claim 12, wherein the correlating the identifier with the range value includes:

determining a range estimate from the property of the transmission; and determining that a difference between the range estimate and the range value is smaller than a threshold.

17. The method of claim 16, wherein the property of the transmission includes at least one of (i) a signal strength measurement, and (ii) a round trip time.

18. The method of claim 16, further comprising:

receiving respective transmissions from a plurality of wireless transmitters including the target wireless transmitter;

determining range estimates corresponding to each of the transmissions; and selecting one of the transmissions closest to the range value as corresponding to the target wireless transmitter.

19. The method of claim 12, wherein storing the generated location in association with the identifier includes:

updating a portion of a map of the facility corresponding to the target wireless transmitter to include the generated location.

* * * * *